US009529728B2

(12) United States Patent
Baskakov et al.

(10) Patent No.: US 9,529,728 B2
(45) Date of Patent: Dec. 27, 2016

(54) METHOD FOR IMPROVING MEMORY SYSTEM PERFORMANCE IN VIRTUAL MACHINE SYSTEMS

(75) Inventors: Yury Baskakov, Newton, MA (US); Alexander Garthwaite, Beverly, MA (US); Jesse Pool, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 1495 days.

(21) Appl. No.: 12/900,271

(22) Filed: Oct. 7, 2010

(65) Prior Publication Data

US 2012/0089764 A1    Apr. 12, 2012

(51) Int. Cl.
*G06F 12/00*    (2006.01)
*G06F 12/10*    (2016.01)

(52) U.S. Cl.
CPC ......... *G06F 12/10* (2013.01); *G06F 2212/151* (2013.01); *G06F 2212/656* (2013.01)

(58) Field of Classification Search
CPC .................................................... G06F 12/00
USPC ......... 711/6, 137, 170, 177, E12.002; 718/1; 726/11, 24
See application file for complete search history.

(56) References Cited

U.S. PATENT DOCUMENTS

| 7,383,415 | B2 * | 6/2008 | Jordan et al. ................. 711/207 |
| 7,711,921 | B2 * | 5/2010 | Schneider ...................... 711/170 |
| 8,234,640 | B1 * | 7/2012 | Fitzgerald et al. ............... 718/1 |
| 2011/0191522 | A1 * | 8/2011 | Condict et al. ............... 711/103 |
| 2011/0302224 | A1 * | 12/2011 | Yairi et al. .................... 707/824 |

* cited by examiner

*Primary Examiner* — Zhuo Li (57) ABSTRACT

Updating contents of certain memory pages in a virtual machine system is deferred until they are needed. Specifically, certain page update operations are deferred until the page is accessed for a load or store operation. Each page within the virtual machine system includes associated metadata, which includes a page signature characterizing the contents of a corresponding page or a reference to a page with canonical contents, and a flag that indicates the page needs to be updated before being accessed. The metadata may also include a flag to indicate that a backing store of the memory page has contents of a known content class. When such a memory page is mapped to a shared page with contents of that known content class, a flag in the metadata to indicate that contents of the memory page needs to be updated is not set.

21 Claims, 7 Drawing Sheets

METHOD FOR IMPROVING MEMORY SYSTEM PERFORMANCE IN VIRTUAL MACHINE SYSTEMS

BACKGROUND

A virtual machine provides an environment in which an operating system may execute with apparent control of a dedicated physical machine. Multiple virtual machines may execute on a common hardware machine, and each virtual machine may operate with protection and isolation from other virtual machines executing on the same common hardware machine. Each virtual machine typically encapsulates a complete executing state for a corresponding operating system, including both user-level applications and kernel-mode operating system services.

In many computing environments, each hardware machine is typically underutilized on average when executing a corresponding server application. As a result of average hardware underutilization over many hardware machines, computing environments configured to dedicate a hardware machine to each server application are typically characterized as being very inefficient with respect to cost, power consumption, management, and potentially reliability.

Virtual machines are advantageously deployed to consolidate multiple software servers in a computing environment onto one or more shared hardware machines for execution. A hypervisor is a software layer that virtualizes hardware resources, and presents a virtual hardware interface to one or more virtual machine instances that may reflect an underlying hardware machine architecture or an abstraction of an arbitrary machine architecture. A guest operating system executing within a virtual machine interacts with an image of guest physical memory, which is organized into storage units referred to as guest physical pages. Each guest physical page is referenced via a guest physical page number (GPPN). Each GPPN is typically mapped to a machine page number (MPN) that is stored in host machine memory.

Without limitation, a guest physical page may be allocated and initialized. After a guest physical page is allocated, the guest operating system commonly initializes the guest physical page with a known pattern, such as a sequence of zeros. Although the guest operating system conventionally initializes each allocated guest physical page with the known pattern, only a subset of the initialized guest physical pages is typically accessed subsequent to initialization. Such an initialization process requires computational effort and memory bandwidth to write the pattern, and each initialized page that is not subsequently accessed represents superfluous computation and memory bandwidth. Computational effort and memory bandwidth associated with guest physical page initialization corresponds to system overhead that generally degrades system performance.

SUMMARY

One or more embodiments of the present invention provide a method for deferring content loading of certain memory pages in a virtual machine system until they are needed. Specifically, certain page update operations are deferred until the page is accessed. Each page within the virtual machine system includes associated metadata, which includes a page signature characterizing the contents of a corresponding page or a reference to a page with canonical contents, and a flag that indicates the page needs to be updated before being accessed. When the page is accessed and the "needs update" flag is set, the virtual machine system first updates the contents of the page to reflect the page signature before completing the access to the updated page. In this way, precise data integrity is preserved, while avoiding superfluous page initialization operations that can generally degrade system performance.

A method of loading memory pages allocated to virtual machines, according to an embodiment of the invention, includes the steps of determining a page signature of a memory page, adding the page signature to metadata of the memory page and conditionally setting a flag in the metadata to indicate that contents of the memory page needs to be updated, and loading the metadata of the memory page into memory without loading the contents of the memory page. In the case where a flag is set to indicate that the contents of the memory page needs to be updated, the contents of the memory page are updated when it is accessed. In some situations the metadata of the memory page includes a flag that is set to indicate that a backing store of the memory page has known contents described by the page's metadata. When such a memory page is to be updated with contents that match such known contents of the page, the update operation is skipped as the page content is already consistent. In addition, when the metadata for such a page is loaded or derived, that metadata may be used to either share the page or create its contents in memory without loading those contents, and in doing so, the "needs update" flag need not be set.

A method of accessing a memory page of a virtual machine for which loading might have been deferred, according to an embodiment of the invention, includes the steps of examining metadata of the memory page and determining that a flag in the metadata for indicating that the contents of the memory page needs to be updated is set, and updating the contents of the memory page. The memory page of the virtual machine may be a guest physical memory page that shares a machine memory page with another guest physical memory page.

A virtual machine computer system, according to an embodiment of the invention, includes a system memory, and one or more processors. The processors are programmed to: (i) execute a virtual machine process, and (ii) load into the system memory metadata of some of the memory pages of the virtual machine process without updating their contents. The metadata of each of such memory pages include a page signature of the memory page and a flag to indicate that the contents of the memory page need to be updated. The metadata of each of such memory pages may further include a flag to indicate that a backing store of the memory page has contents of a known content class.

DETAILED DESCRIPTION

Figure 1:
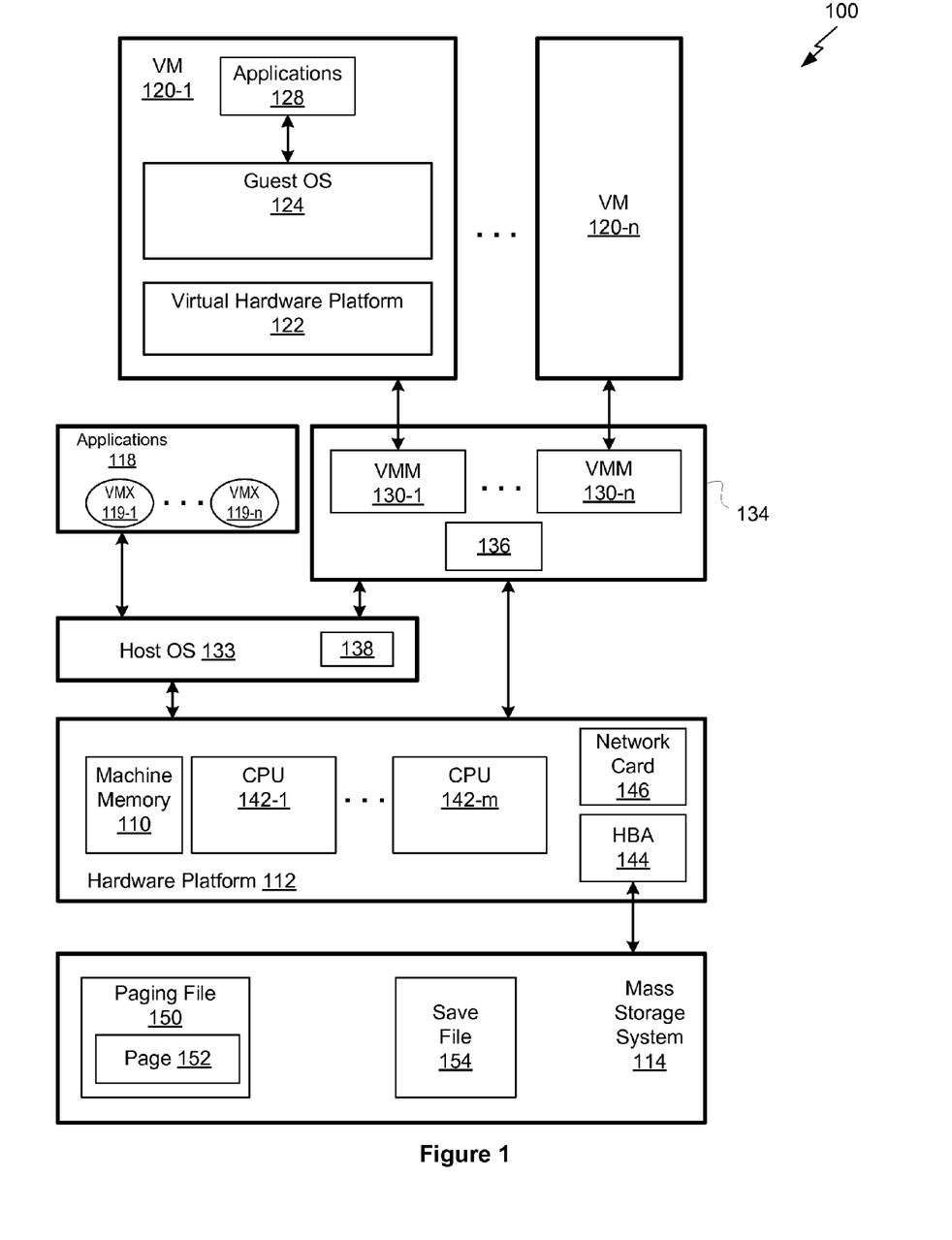
FIG. 1 is a block diagram illustrating a computer system configured to implement one or more aspects of the present invention.

FIG. 1 is a block diagram illustrating a computer system 100 configured to implement one or more aspects of the present invention. The computer system 100 includes a hardware platform 112 that includes system or machine memory 110, one or more central processing units (CPUs) 142-1 through 142-*m*, a host bus adapter (HBA) 144, and a network card 146. The computer system 100 further includes a mass storage system 114, which implements a persistent storage system. The mass storage system 114 is coupled to the hardware platform 112 through HBA 144 via a native storage interface, such as serial advanced technology attachment (SATA), serial attached small computer system interface (SAS), or any other technically feasible native storage interface, or via a network enabled storage interface such as Fibre Channel, internet small computer system interface (iSCSI), or any other technically feasible network enabled storage interface.

A host operating system (OS) 133, which may be any of the commodity operating systems, and a virtualization layer 134 runs on top of the hardware platform 112. The host OS 133 includes drivers, and supports applications 118 and virtual machines (VMs) 120-1 through 120-*n*, through the virtualization layer 134. Applications 118 include user-level processes VMX 119-1 through VMX 119-*n*, one for each of the VMs 120-1 through 120-*n*. The virtualization layer 134, by way of virtual machine monitors (VMMs) 130-1 through 130-*n*, maps the physical resources of hardware platform 112 to virtual resources of the VMs 120, such that each VM 120 has its own virtual hardware platform 122. Each VM 120 further includes a guest operating system (OS) 124 that provides user-level applications 128 running in VM 120 an interface to the virtual hardware platform 122. Further details of the components of the computer system 100 are described in U.S. Pat. No. 6,789,156, which is hereby incorporated by reference in its entirety.

In the embodiment illustrated in FIG. 1, the user-level processes VMX 119-1 through VMX 119-*n* are shown as applications running on top of the host OS 133. In alternative embodiments, these supporting/extending processes may be implemented in the virtualization layer 134 or may be part of the VMMs 130, or a driver in the host OS 133.

During normal execution, applications 128 and guest OS 124 generate load and store requests targeting a virtual address space, organized as guest virtual page numbers (GVPNs) by the guest OS 124. The virtual address space maps to a guest physical address space, organized as guest physical page numbers (GPPNs). Each one of VMs 120 has an independent guest physical address space, and therefore a given GPPN within one VM is independent of the same GPPN within a different VM 120. Each guest physical page is mapped to a page that is stored in either machine memory 110 (MPN), or to a page stored on the mass storage system 114. In computer systems that support page sharing, more than one GPPN may map to a single MPN.

In one embodiment, the GPPN to MPN mappings are provided by the host OS 133. In alternative embodiments, each VMM 130 may provide the GPPN to MPN mappings for its corresponding VM 120. In certain embodiments, the VMM 130 performs direct GVPN to MPN mappings for high performance memory access from each corresponding VM 120. In addition, certain memory management unit implementations within CPUs 142 allow nested mappings, enabling the CPUs 142 to perform direct GVPN to MPN mappings for high performance access from each corresponding VM 120.

The total storage configured for all guest physical address spaces may exceed the total available storage within machine memory 110. The host OS 133 facilitates a memory paging system configured to page in and page out selected pages of memory between machine memory 110 and paging file 150 within the mass storage system 114. In an alternative embodiment, a distinct paging file may be associated with each VM 120. The paging file may be used to manage each guest physical space comprising GPPNs associated with a particular VM 120. In addition, the paging file may be mapped into the virtual address space of user-level process VMX 119, which enables the VMM 130 to have the host OS 133 perform certain tasks (such as I/O) on its behalf. This is achieved by the VMM 130 calling through a driver in the host OS 133 to the user-level process VMX 119, which then submits the task request to the host OS 133. It should be recognized that these and other file organizations and backing schemes may be implemented without departing the scope of the invention. For example, in some embodiments, the paging file may only contain reserved slots for a subset of the total number of GPPNs.

When a page of memory is paged out from machine memory 110 to the paging file 150, a memory management table 136, provided in the virtualization layer 134, is updated to reflect a change in disposition of the corresponding GPPN as residing on disk in the paging file 150 rather than resident in machine memory 110. Similarly, when a page 152 residing within the paging file 150 is paged into machine memory 110, the memory management table 136 may be updated to reflect another change in disposition for the corresponding GPPN as being resident in machine memory 110 rather than in the paging file 150. While only a portion of all valid GPPNs may exist in machine memory 110 (mapped to MPNs) at any one time, a slot is reserved within the paging file 150 for each allocated GPPN. Furthermore, an entry may be allocated within the memory management table 136 for each page 152 within the paging file 150.

A memory image for a typical guest OS 124 operating in concert with a typical application 128 will commonly include a large number of pages of memory written with identical data. One form of identical data is a repeating pattern characterized by a finite number of bytes. For example, pages of memory written completely with zeros occur commonly, and can be described completely as a repeating pattern of one byte that contains a value of 0x00. In general, pages written with repeating patterns or regular expressions may be completely described via a corresponding characteristic pattern and a construction rule or "class description." Another form of identical data is characterized by complex patterns that have no discernible structure other than being instantiated multiple times as whole pages. Such pages may be described via a reference to a canonical instance of the page; in this case, the class description is that of an "unknown class" rather than a specific construction class. As a way to classify and track these types of pages and to map pages written with identical data to a single MPN, one or more embodiments of the invention employ a module 138. The module 138 is implemented to include multiple functions including page classification functions used to identify characteristics of page contents, and contents tracking functions used to manage the allocation and mapping of MPNs and mapping of GPPNs to MPNs. The module 138 may be implemented as a kernel module operable in kernel space within the host OS 133, or implemented partially as a kernel module operable in kernel space of the host OS 133 and partially as an application operable in user space of VMX 119.

In the embodiment illustrated in FIG. 1, the module 138 is shown as part of the host OS 133. In alternative embodiments, the module 138 may be implemented in the virtualization layer 134 or within the VMMs 130. The module 138 may also be provided per-VMM 130 or per-VMX 119 as a way to implement page sharing within individual VMs 120, e.g., to share common data pages like the zero-page.

In one embodiment, the module 138 generates a page signature that is used to efficiently classify contents for each MPN. Certain forms of page signature completely represent page contents for pages that comprise a simple, recognizable pattern. The simple, recognizable pattern is represented as a specific pattern class description and a corresponding data pattern represented as a page identification tag. Other forms of page signatures efficiently indicate potentially equivalent pages. For example, a hash tag may be generated from page data to indicate potentially equivalent page contents with other pages characterized by an identical hash tag. The module 138 is also configured to determine whether a given GPPN may share a common MPN with other GPPNs, to initiate the sharing, and to facilitate sharing termination when one GPPN needs a private MPN, for example using a "copy on write" technique. The module 138 further includes a hash table, or any other technically feasible data structure, configured to store page signature data that may be used to determine if a given page is identical to an existing page, and if sharing may proceed.

Each GPPN mapped to a shared MPN is marked with a "copy on write" (COW) attribute. "Copy on write" describes a well known technique in the art in which a new instance of a shared MPN is created and mapped directly to the GPPN being written. When a write operation to a GPPN marked with a COW attribute is performed, a new MPN is allocated and the contents of the original MPN are copied to the new MPN. The GPPN being referenced is then mapped to the new MPN and the associated COW attribute is cleared for the new mapping. Contents of U.S. Pat. Nos. 6,789,156 and 7,620,766 relating to read-only mappings, COW, content-based deduplication, and accelerated comparisons by hashing, are hereby incorporated by reference.

Embodiments of the present invention may be employed during a save and restore operation. During the save operation, VM 120-1 is halted and a save file 154 is generated to capture a precise executing state of the VM 120-1. During the restore operation, save file 154 is read into the state of VM 120-1 and execution commences. To improve performance and reduce overall storage associated with generating the save file 154, each GPPN that may be characterized completely by a repeating pattern (or, for example, any other regular expression) is compressed to a description of the pattern rather than an actual page of data containing the pattern. Furthermore, each GPPN may be represented as a reference to a canonical reference page stored to save file 154. In this way, certain pages may be compressed and stored in metadata for the pages rather than stored as corresponding data within the pages.

In one embodiment, the save file 154 is organized to include metadata for each GPPN, and page data to which GPPNs map. Page data may be organized within the save file 154 according to sharing status. For example, shared pages of page data may be stored together in one region of the save file 154, and restored prior to restoring other pages of data stored within the save file 154. It should be recognized that restoring certain categories of pages, such as shared, hot, and cold pages, in sequence may provide certain performance advantages. Page data matching no known pattern class may be stored in a compressed format within the save file 154 using any technically feasible lossless compression technique. GPPNs may also be stored within the save file 154 in an unshared configuration, but with metadata configured to indicate which pages are identical for potential page sharing. On restoration, the metadata is used to facilitate sharing for a restored image. Metadata for each GPPN within the save file 154 may also indicate pattern information for corresponding GPPNs that are characterized as having a known pattern, such as a repeating pattern of zero or "0xDEAD-BEEF." Upon executing a restore operation, the metadata may uniquely indicate how a page is to be reconstructed for use. Certain metadata may be represented as a bitmap, for example, to indicate which GPPNs are identical. In one bitmap representation, each GPPN stored in the save file has a corresponding bit within the bitmap. A GPPN is represented as being in a particular page set, such as a zero page set, when a corresponding bit is set within the bitmap. One or more page sets may be represented by corresponding bitmaps stored within the save file 154. It should be recognized that other data structures may be also used to represent metadata for pages and page sets without departing the scope of the present invention.

During the restore operation, page data stored in the save file 154 is read and allocated to GPPNs. Some of the page data allocated to GPPNs may already be reflected in machine memory 110. However each allocated GPPN is represented within the paging file 150. In one embodiment, a first instance of a new page causes a corresponding page to be allocated and reconstructed according to a class and pattern description stored in metadata for the page. The reconstructed page may be instantiated as a canonical page for that class and pattern within machine memory 110. Each identical page has a separate GPPN entry, but the GPPN entries are mapped to the MPN of the matching canonical page. In an alternative embodiment, the restore operation maps each GPPN to a corresponding private MPN, without allowing a GPPN to share an MPN. It should be recognized that the restore operation may implement various modes, including one mode with page sharing enabled and a different mode with page sharing disabled.

When a VM 120 is migrated from computer system 100 to a different target computer system (not shown) for execution on the target computer system, a data set corresponding to save file 154 is generated and transmitted, for example via network card 146, to the target computer system. Saving and restoring are generally performed as described above with respect to the save file 154. However, data otherwise bound for the save file 154 is transported to the target computer system for execution. In one embodiment, a save file 154 is created on the source computer system 100 and transmitted to the target computer system for storage in nonvolatile memory and execution from system memory. In an alternative embodiment, save data from the source computer system 100 is transmitted to the target computer system for storage in nonvolatile memory and execution from system memory. In another alternative embodiment, save data from the source computer system 100 is transmitted directly to the target computer system for storage in nonvolatile memory and execution from system memory without being stored in the source computer system 100. In yet another alternative embodiment, save data from the source computer system 100 is transmitted directly to the target computer system and loaded directly into system memory for execution.

Figure 2:
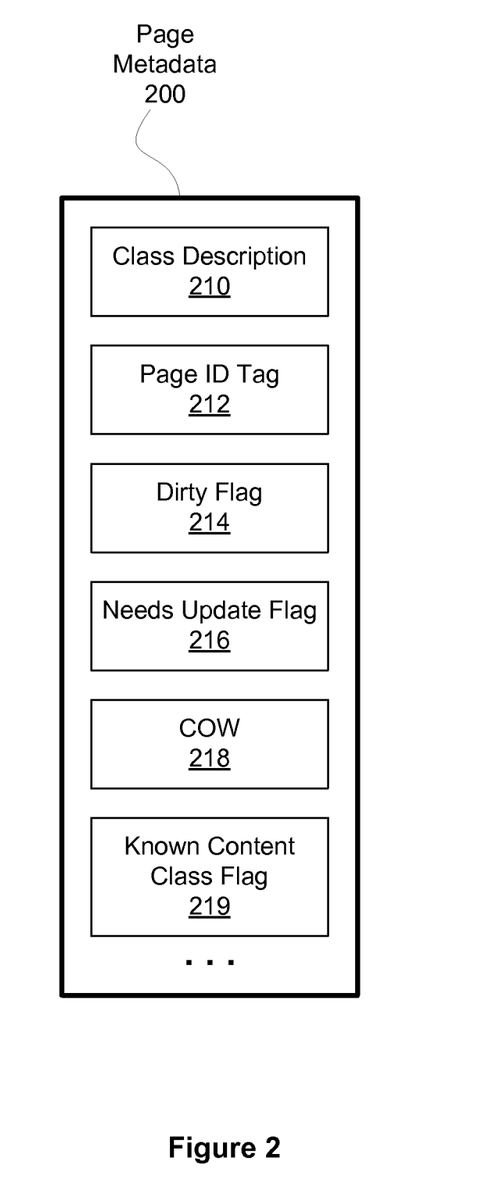
FIG. 2 illustrates page metadata associated with a page of memory, according to one embodiment of the invention.

FIG. 2 illustrates page metadata 200 associated with a page of memory accessed by a virtual machine or a page in the paging file 150, according to one embodiment of the invention. The page metadata 200 may be stored in any technically feasible data structure or collection of data structures, and preferably remains resident in machine memory. The page metadata 200 may include, without limitation, a class description 210, a page identification (ID) tag 212, a dirty flag 214, a "needs update" flag 216, a COW flag 218, and one or more flags 219, each associated with a known content class, such as a zero page class. In one embodiment, the page metadata 200 applies to a given GPPN.

The class description 210 indicates whether the given GPPN may be classified using a known pattern, in which case the page ID tag 212 specifies the pattern. If the class description 210 indicates the GPPN contains data with an unknown pattern, then the page ID tag 212 may represent a hashing function output for data stored in the given GPPN. In one embodiment, the class description 210 and page ID tag 212 together form the page signature that may be used to efficiently classify contents for the given GPPN. The page metadata can record unique pattern information for pages with matching patterns, or the page metadata can represent unique pattern information via an index to a table of representative data patterns.

The dirty flag 214 indicates that the given page may have been modified and may contain different data than a corresponding page residing in a paging file 150. When the dirty flag 214 is set, a page management system may opportunistically flush contents of the page back to the paging file 150. The page management system flushes the contents of the page back to the paging file 150 to maintain proper state within the paging file 150 when the corresponding page is reclaimed.

The "needs update" flag 216 indicates that the given page does not necessarily contain up to date data and that the data may need to be reconstructed from the class description 210 and the page ID tag 212 or from a canonical copy. When the "needs update" flag 216 is set, the page is updated upon being accessed, as described in greater detail below in FIGS. 3A through 5. Computation associated with reconstructing the page is therefore beneficially conserved prior to the page being accessed.

The COW flag 218 indicates the given MPN needs to be copied to a new MPN when a store operation is to be performed on a GPPN mapped to the given MPN. The GPPN initiating the store operation has to be remapped to the new MPN.

Flag 219 is associated with a known content class, such as a zero page class. Although only one is illustrated in FIG. 2, more than one such flag may be provided in the page metadata 200. When the contents of a given page belong to any of the known content classes associated with the flag 219, the corresponding flag 219 is set. This flag is reset when the page is mapped for write. This flag may be used in conjunction with the "needs update" flag 216 but it may also be used in cases where the corresponding page in the paging file 150 is known to be consistent with the known content class specified by flag 219. As in the case of the "needs update" flag 216 being set, the known consistent state may be used to avoid reading the contents from the paging file 150, instead creating the page contents in memory from that known content class, and may be used to share the pages in the known state without examining their contents. One example where flag 219 is used is for zero pages and upon powering on of VM 120. When VM 120 powers on, the paging file 150 is allocated and it is known that all pages in the paging file are pre-zeroed on allocation. Thus, upon VM power on, when all guest physical pages are to be zeroed and mapped to a shared zero MPN, there would be no need to set the "needs update" flag 216 for the page metadata of such guest physical pages. This is because it is known that all pages in the page file contain zeroes. The flag 219 may be set upon VM power on, e.g., if the flag 219 is associated with the zero contents class. If the flag 219 is associated with other types of known content class, the determination of whether a page belongs to that class may be made while the VM is executing, e.g., when the page contents are examined to find a match for sharing by the module 138. It should be recognized that the class description 210 and the page ID tag 212, if available, may provide the desired encoding of the known content class.

Figure 3A:
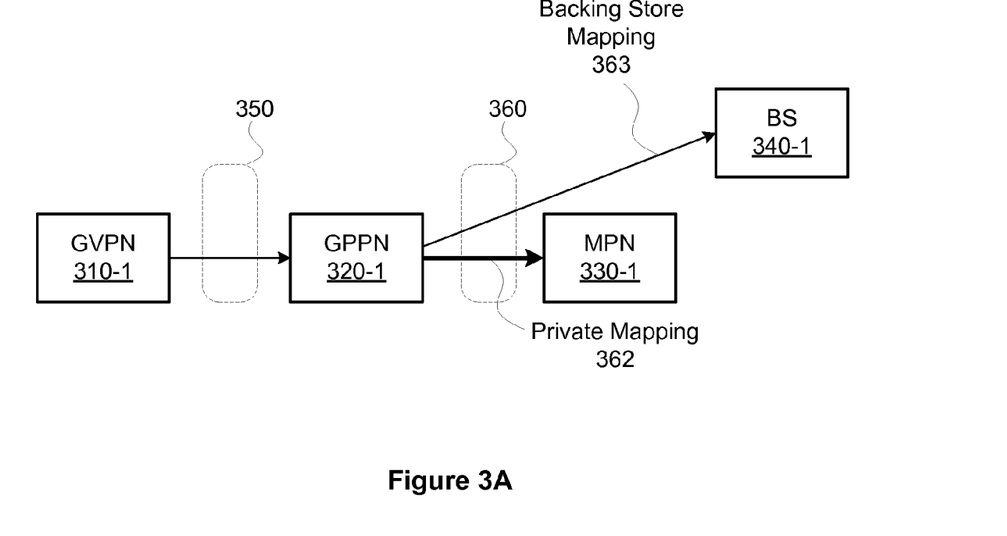
FIG. 3A illustrates a newly allocated guest physical page with a private mapping, according to one embodiment of the present invention.

FIG. 3A illustrates a newly allocated guest physical page GPPN 320-1 with a private mapping 362, according to one embodiment of the present invention. When guest OS 124 of FIG. 1 requests a page of virtual memory, a GVPN 310-1 is mapped via a mapping function 350 to a GPPN 320-1, which is further mapped via mapping function 360, and specifically a private mapping 362, to MPN 330-1. The GPPN 320-1 is also mapped by a backing store mapping function 370 to a backing store (BS) page 340-1. Mapping functions 350 and 360 may be implemented using any technically feasible technique. In one embodiment mapping functions 350 and 360 are performed by an MMU configured to perform nested mapping of addresses to generate a machine physical address to a corresponding MPN 330.

In some embodiments, the backing store may be mapped into the virtual address space of user level process VMX 119 in the computer system 100, in which some virtual devices are emulated in user space. For these virtual devices, the mapping is from the user-level virtual page numbers to backing store page numbers.

Newly mapped guest page GPPN 320-1 may be initialized with a pattern that may be represented as a page signature, according to class description 210 and page ID tag 212 of FIG. 2. Furthermore, the pattern may be generated by a fragment of code within the guest OS 124 that may be recognized and intercepted by a virtualization system component, such as VMM 130, virtual processor 122, or a support module in the virtualization layer 134, which preempts execution of the initialization code. Rather than executing the initialization code, the virtualization system determines the class description 210 and page ID tag 212 for the memory page to be initialized, and sets the "needs update" flag 216 to true. When, or if, the memory page is actually requested for access at a later time, the page is initialized with a pattern the initialization code would have written. Because the guest OS 124 typically endeavors to initialize more pages than are actually accessed for use, a net performance benefit is gained by deferring the initialization process for a specific page until the page is actually requested for access.

Figure 3B:
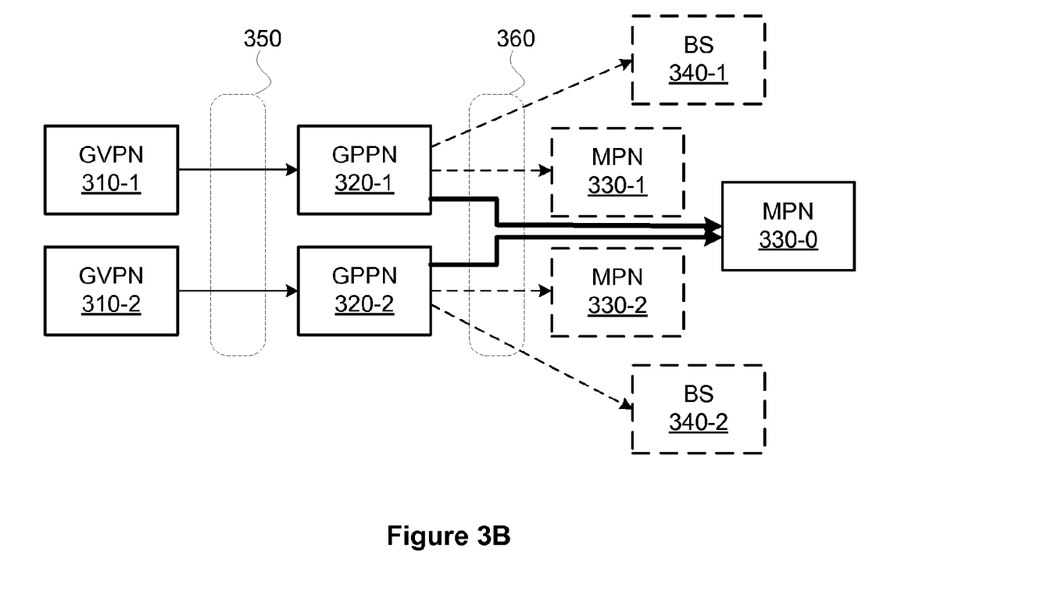
FIG. 3B illustrates guest physical pages configured for sharing, according to one embodiment of the present invention.

FIG. 3B illustrates guest physical pages, GPPNs 320-1, 320-2, that were initially mapped to existing machine pages, MPNs 330-1, 330-2, and backing store pages, BS 340-1, 340-2, and now share a common machine page, MPN 330-0. Upon determination by the module 138 that GPPN 320-1, 320-2 contain identical contents, MPNs 330-1, 330-2 are released and new shared MPN 330-0 is allocated with its contents identical to MPN 330-1 and MPN 330-2. It should be recognized that an arbitrarily large number of additional GPPNs 320, all with matching page signatures, may share MPN 330-0. The arbitrarily large number of GPPNs 320 may be mapped without incurring initialization overhead until a specific GPPN is requested for access. When initialization is skipped for any GPPN, the "needs update" flag is set in the metadata for that GPPN. By deferring initialization overhead, overall performance benefits to VMs 120, including, for example, faster boot times, can be achieved.

Figure 3C:
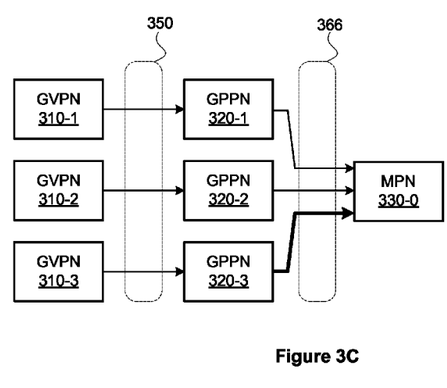
FIG. 3C illustrates a guest physical page mapped to a shared machine page number prior to termination of sharing, according to one embodiment of the present invention.

FIG. 3C illustrates guest physical pages, GPPNs 320-1, 320-2, 320-3, mapped to a shared machine page number MPN 330-0 prior to termination of sharing, according to one embodiment of the present invention. As shown, GVPNs 310-1, 310-2, 310-3 each map to GPPNs 320-1, 320-2, 320-3, respectively, via mapping function 350. GPPNs 320-1, 320-2, 320-3 each map to MPN 330-0 via shared mapping function 366. To the extent the guest does not attempt to modify MPN 330-0, this sharing configuration may be maintained. However, if any of GVPNs 310-1, 310-2, 310-3 is presented with a data store request, then sharing needs to be terminated, as described below in FIG. 3D.

Figure 3D:
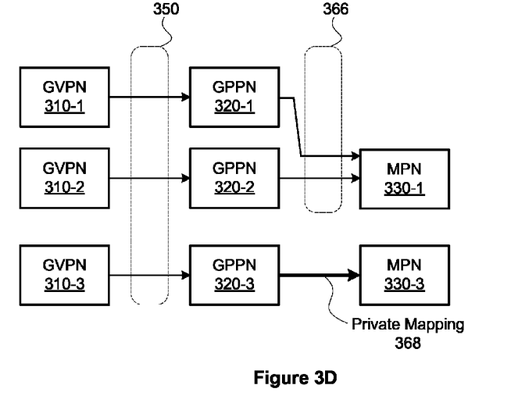
FIG. 3D illustrates a guest physical page mapped to a new machine page number after termination of sharing, according to one embodiment of the present invention.

FIG. 3D illustrates a guest physical page, GPPN 320-3, mapped to a new machine page number 330-3 after termination of sharing, according to one embodiment of the present invention. As shown, MPN 330-0 may continue to be shared for GPPNs 320-1, 320-2. However, GPPN 320-3 requires a private MPN 330-3. Therefore, private mapping 368 is configured to map GPPN 320-3 to MPN 330-3. Furthermore GPPN 320-3 is marked dirty. At this point execution may continue, without further interruption to guest OS 124.

Figure 4A:
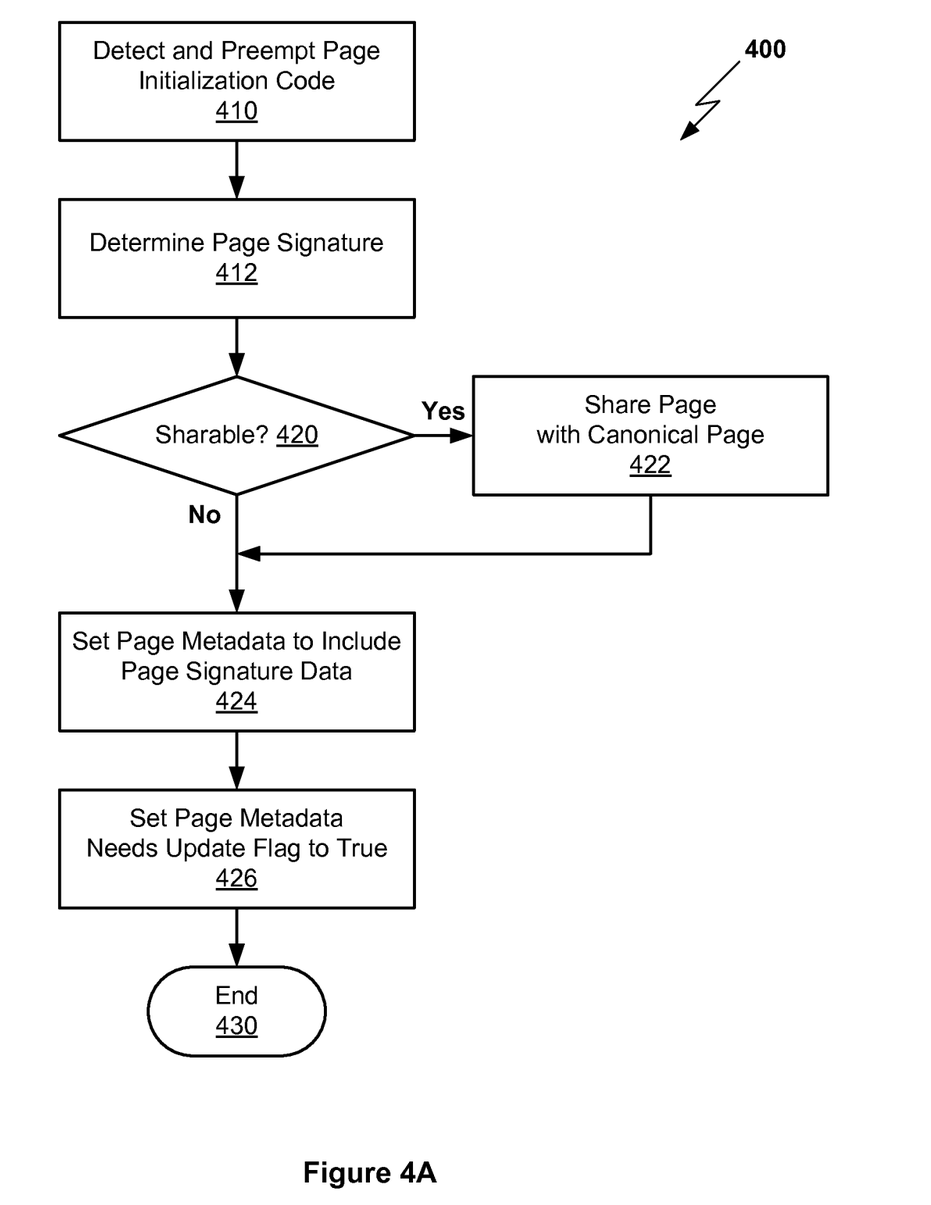
FIG. 4A is a flow diagram of method steps, performed by a virtualization system, for detecting page initialization to a specific pattern and either marking the page for update or mapping the page to a canonical page for the pattern, according to one embodiment of the invention.

FIG. 4A is a flow diagram of method steps 400, performed by a virtualization system, for detecting page initialization to a specific pattern and either marking the page for update or mapping the page to a canonical page for the pattern, according to one embodiment of the invention. Although the method steps are described in conjunction with the system of FIGS. 1, 2, and 3A-3D, persons skilled in the art will understand that any system configured to perform the method steps is within the scope of the invention. The virtualization system may include, without limitation, the virtual processor 122 of FIG. 1, or the virtualization layer 134 and modules therein.

The method begins in step 410, where the virtualization system detects and preempts execution of page initialization code that is known to produce a page having a specific page signature. Such page initialization code is common in commodity guest operating systems, and may be detected using any technically feasible technique. Once the page initialization code has been detected and preempted, the virtualization system determines a page signature, comprising a class description 210 and page ID tag 212 reflective of the initialization code. Techniques for detecting when page initialization code is about to execute are described in U.S. patent application Ser. No. 12/246,402, entitled "System and Method for Maintaining Memory Page Sharing in a Virtual Environment," filed Oct. 6, 2008, which is incorporated by reference herein in its entirety.

If, in step 420, the page is not sharable based on the page signature, then the method proceeds to step 424. The page may be found to be sharable or not sharable by performing a hash search on the hash table associated with the module 138, using the page signature as a hash query. In step 424, the virtualization system sets page metadata for the page to include page signature data. In step 426, the virtualization system sets the "needs update" flag of the page metadata to true. The method terminates in step 430.

Returning to step 420, if the page is sharable based on the page signature, then the method proceeds to step 422, where the virtualization system shares the page with a canonical page based on the page signature. After step 422, the method continues onto steps 424, 426 and 430, described above.

Figure 4B:
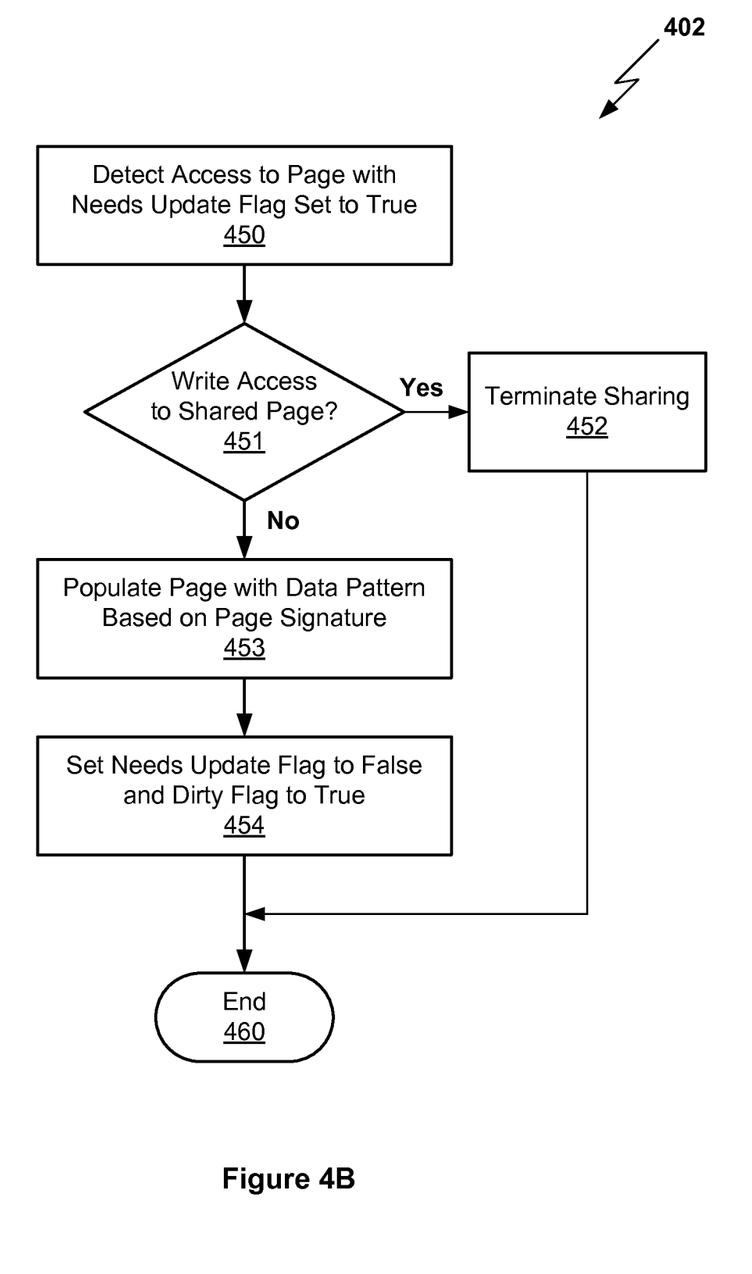
FIG. 4B is a flow diagram of method steps, performed by the virtualization system, for initializing a page with a pattern prior to use, according to one embodiment of the invention.

FIG. 4B is a flow diagram of method steps 402, performed by the virtualization system, for initializing a page with a pattern prior to use, according to one embodiment of the invention. Although the method steps are described in conjunction with the system of FIGS. 1, 2, and 3A-3D, persons skilled in the art will understand that any system configured to perform the method steps is within the scope of the invention. The virtualization system may include, without limitation, the virtual processor 122 of FIG. 1, or the virtualization layer 134 and modules therein.

The method begins in step 450, where the virtualization system detects access to a page with a "needs update" flag 216 of FIG. 2 set to true. In step 451, the virtualization system checks to see if the access is a write access to a shared page. If it is, sharing is terminated in step 452 according to the method described below in conjunction with FIG. 5. If not, the method continues onto step 453. In step 453, the virtualization system populates the page with a data pattern based on the page signature, which includes metadata for class description 210 and page ID tag 212. In step 454, the virtualization system sets the "needs update" flag 216 to false. The virtualization system also sets the dirty flag 214 to true because the corresponding MPN and corresponding page in the paging file 150 may now contain different data. The method terminates in step 460.

Figure 5:
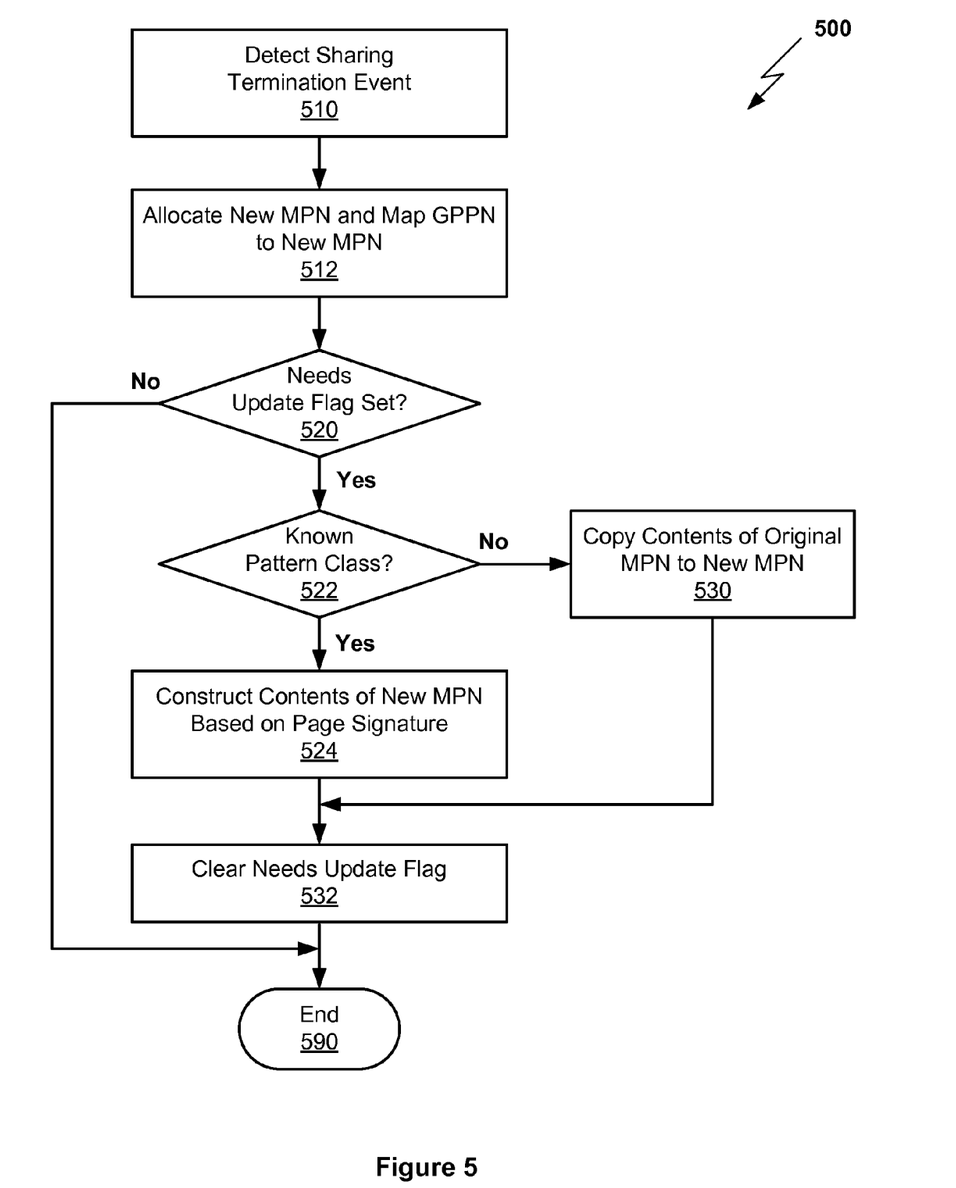
FIG. 5 is a flow diagram of method steps, performed by the virtualization system, for terminating page sharing, according to one embodiment of the invention.

FIG. 5 is a flow diagram of method steps 500, performed by the virtualization system, for terminating page sharing, according to one embodiment of the invention. Although the method steps are described in conjunction with the system of FIGS. 1, 2, and 3A-3D, persons skilled in the art will understand that any system configured to perform the method steps is within the scope of the invention. The virtualization system may include, without limitation, the virtual processor 122 of FIG. 1, or the virtualization layer 134 and modules therein.

The method begins in step 510, where the virtualization system detects a sharing termination event. One example of a sharing termination event is an attempt to perform a data store operation on a GPPN mapped to a shared MPN. In step 512, the virtualization system allocates a new MPN and maps the GPPN associated with the termination event to the new MPN.

In step 520 the page metadata for the GPPN is examined to see if the "needs update" flag is set. If the "needs update" flag is not set, the method terminates in step 590. On the other hand, if the "needs update" flag is set, the method continues onto step 522. In step 522, the page metadata for the GPPN is examined to see if it belongs to a known pattern class. If so, the contents of the new MPN are constructed using the page signature in step 524. Otherwise, the contents from the shared MPN are copied into the new MPN in step

530. In alternative embodiments, even if a known pattern is detected in step 522, step 530 may be executed in lieu of step 524. In step 532, the virtualization system clears the "needs update" flag 216 in the page metadata for the GPPN. The method then terminates in step 590.

In sum, a technique for improving memory system performance is disclosed. Initialization of a newly allocated guest physical page and its backing store may be deferred until the page is subsequently accessed for load or store operations. Certain guest operating system modules perform page initialization, which may be intercepted and marked for update with a page signature reflective of what the page content should contain after initialization. If a page that is marked for update is accessed, the page is first updated to reflect an appropriate initial pattern first. Initialization may also be deferred upon termination of sharing for an arbitrary MPN characterized by a known pattern class.

One advantage of the present invention is that overall performance may be improved compared to prior art techniques because, in general, only pages that need to be written with initialization patterns are actually written with initialization patterns. By contrast, prior art techniques speculatively write large numbers of pages with initialization patterns as a normal course of overall system initialization.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of loading memory pages allocated to virtual machines, comprising:
   determining a page signature of a memory page;
   adding the page signature to metadata of the memory page and setting a flag in the metadata to indicate that contents of the memory page need to be updated; and
   loading the metadata of the memory page into memory without loading the contents of the memory page.

2. The method according to claim 1, further comprising:
   detecting access to the memory page; and
   updating the contents of the memory page based on the page signature of the memory page if the flag is set.

3. The method according to claim 2, further comprising:
   clearing the flag in the metadata after updating the contents of the memory page to indicate that contents of the memory page need no updating.

4. The method according to claim 1, further comprising:
   determining if the memory page is sharable; and
   if the memory page is sharable, mapping the memory page to a location in memory that contains a canonical page corresponding to the page signature of the memory page.

5. The method according to claim 4, wherein, upon termination of a sharing event, the memory page is mapped to a different location in memory.

6. The method according to claim 5, further comprising:
   determining if the memory page belongs to a known pattern class;
   if the memory page belongs of a known pattern class, updating the contents of the memory page based on the page signature and clearing the flag in the metadata to indicate that contents of the memory page need no updating; and
   if the memory page does not belong to a known pattern class, copying contents from the shared location in memory to the different location in memory and clearing the flag in the metadata to indicate that contents of the memory page need no updating.

7. The method according to claim 1, wherein the contents of the memory page have a known pattern or a regular expression.

8. The method according to claim 1, wherein the contents of the memory page are all zeros.

9. The method according to claim 1, further comprising:
mapping another memory page to a shared location in memory;
determining from metadata of said another memory page that a backing store for said another memory page has content of a known content class; and
if a page signature of said another memory page does not indicate that said memory page belongs to said known content class, setting a flag in the metadata of said another memory page to indicate that contents of said another memory page need to be updated, and
if the page signature of said another memory page does indicate that said memory page belongs to said known content class, not setting the flag.

10. A virtual machine computer system, comprising:
a system memory; and
one or more processors programmed to execute a virtual machine process, and to load into the system memory, metadata of some of the memory pages of the virtual machine process without loading the contents of said some of the memory pages,
the metadata of each of said some of the memory pages including a page signature of the memory page and a flag to indicate that the contents of the memory page need to be updated.

11. The virtual machine computer system of claim 10, wherein the one or more processors are programmed to also load into the system memory, the contents of said some of the memory pages when the memory pages are accessed.

12. The virtual machine computer system of claim 10, wherein the one or more processors are programmed to also load into the system memory, contents of a shared page and map at least one of the memory pages of the virtual machine process to a location in the system memory where the contents of the shared page are stored.

13. The virtual machine computer system of claim 12, wherein the one or more processors are programmed to also copy the memory contents of the shared page to a new location in the system memory and map said at least one of the memory pages of the virtual machine process to the new location in the system memory when a data store operation is carried out on the shared page.

14. The virtual machine computer system of claim 10, wherein the metadata of each of said some of the memory pages further includes a flag to indicate that a backing store of the memory page has contents of a known content class.

15. A method of loading memory pages allocated to virtual machines, comprising:
determining a page signature of a memory page;
adding the page signature to metadata of the memory page and setting a flag in the metadata to indicate that contents of the memory page are of a known content class; and
loading the metadata of the memory page into memory without loading the contents of the memory page.

16. The method according to claim 15, further comprising:
determining if the memory page is sharable; and
if the memory page is sharable, mapping the memory page to a location in memory that contains contents of the known content class.

17. The method according to claim 15, wherein the contents of the memory page are described by a regular expression.

18. The method according to claim 17, wherein the contents of the memory page are all zeroes.

19. The method according to claim 15, wherein a different flag is provided for each of different known content classes.

20. The method according to claim 15, further comprising:
determining based on the known content class that the contents of the page are unmodified if a write operation is performed on the memory page, and not performing said write operation.

21. The method according to claim 15, further comprising:
when the memory page is accessed, deriving the contents of the memory page solely from the known content class, and not loading said contents.

* * * * *